(12) United States Patent
Harvey

(10) Patent No.: US 10,062,028 B2
(45) Date of Patent: Aug. 28, 2018

(54) METHOD AND SYSTEM TO COUNT MOVEMENTS OF PERSONS FROM VIBRATIONS IN A FLOOR

(71) Applicant: Thomas Danaher Harvey, Rockville, MD (US)

(72) Inventor: Thomas Danaher Harvey, Rockville, MD (US)

( * ) Notice: Subject to any disclaimer, the term of this patent is extended or adjusted under 35 U.S.C. 154(b) by 0 days.

(21) Appl. No.: 15/864,026

(22) Filed: Jan. 8, 2018

(65) Prior Publication Data

US 2018/0150738 A1    May 31, 2018

Related U.S. Application Data

(60) Provisional application No. 62/444,841, filed on Jan. 11, 2017.

(51) Int. Cl.
| | | |
|---|---|---|
| *G08C 19/16* | (2006.01) | |
| *G06M 1/27* | (2006.01) | |
| *G06K 17/00* | (2006.01) | |
| *G06K 7/10* | (2006.01) | |
| *G06K 19/14* | (2006.01) | |
| *G06K 9/00* | (2006.01) | |
| *G06K 19/07* | (2006.01) | |
| *G06T 1/00* | (2006.01) | |

(Continued)

(52) U.S. Cl.
CPC ............. *G06M 1/27* (2013.01); *F41A 17/063* (2013.01); *G06K 7/10297* (2013.01); *G06K 9/00348* (2013.01); *G06K 9/00362* (2013.01); *G06K 17/0022* (2013.01); *G06K 19/0711* (2013.01); *G06K 19/14* (2013.01); *G06T 1/0007* (2013.01); *F41A 17/06* (2013.01); *F41A 17/066* (2013.01); *G06K 2017/0045* (2013.01); *G06K 2017/0096* (2013.01); *G06N 99/005* (2013.01); *G06T 2207/30236* (2013.01); *G06T 2207/30242* (2013.01)

(58) Field of Classification Search
None
See application file for complete search history.

(56) References Cited

U.S. PATENT DOCUMENTS

| | | | | |
|---|---|---|---|---|
| 5,068,537 A | * | 11/1991 | Ishikawa .................. | G01V 8/20 250/342 |
| 5,121,201 A | * | 6/1992 | Seki .................... | G06K 9/00362 348/143 |

(Continued)

*Primary Examiner* — Curtis King

(57) ABSTRACT

A system and method for counting persons using passages entering or exiting an area by analyzing vibrations in the floor with sensors and a machine learning system. The machine learning system uses a model, usually implemented as a neural network on a processor. The network is trained in levels and implemented in layers. Different levels classify and analyze vibrations by timing and frequency, by movements of persons, and by identity of persons The same person is identified by patterns in the vibrations and the vibrations are correlated to determine when a person uses a combination of passages and is thereby counted. Location information for the person is used to identify persons in places and doing activities of interest. The model may be trained on one processor and then downloaded to another processor for evaluation. Additional sensors and levels of training may be implemented on the latter processor.

13 Claims, 7 Drawing Sheets

(51) Int. Cl.
*F41A 17/06* (2006.01)
*G06N 99/00* (2010.01)

(56) References Cited

U.S. PATENT DOCUMENTS

| | | | | |
|---|---|---|---|---|
| 5,187,688 A * | 2/1993 | Saruta | ............ | G01S 15/50 367/108 |
| 5,255,301 A * | 10/1993 | Nakamura | ............ | G06M 1/101 250/221 |
| 5,656,801 A * | 8/1997 | Goren | ............ | G07C 9/00 235/98 B |
| 5,929,787 A * | 7/1999 | Mee | ............ | G08G 1/07 340/683 |
| 5,946,368 A * | 8/1999 | Beezley | ............ | G07C 9/00 377/17 |
| 6,327,547 B1 * | 12/2001 | Shapira | ............ | G01G 19/42 377/45 |
| 8,659,429 B1 * | 2/2014 | Wagner | ............ | G01S 5/0263 340/539.13 |
| 9,672,462 B2 * | 6/2017 | Mlybari | ............ | G06M 1/00 |
| 2003/0066875 A1 * | 4/2003 | Rouet | ............ | G07C 9/00 235/375 |
| 2003/0179127 A1 * | 9/2003 | Wienand | ............ | G07C 9/00 342/28 |
| 2004/0238628 A1 * | 12/2004 | Clark | ............ | G07C 9/00 235/382 |
| 2005/0001154 A1 * | 1/2005 | Sumitomo | ............ | G06M 1/101 250/221 |
| 2005/0012613 A1 * | 1/2005 | Eckstein | ............ | G06K 7/0008 340/539.13 |
| 2008/0239073 A1 * | 10/2008 | Ruohonen | ............ | G07C 9/00 348/143 |
| 2009/0010490 A1 * | 1/2009 | Wang | ............ | G06K 9/00771 382/103 |
| 2010/0021009 A1 * | 1/2010 | Yao | ............ | G06K 9/00785 382/103 |
| 2010/0273491 A1 * | 10/2010 | Colonna | ............ | G08G 1/0104 455/440 |
| 2011/0295392 A1 * | 12/2011 | Cunnington | ............ | G06Q 10/10 700/90 |
| 2013/0015355 A1 * | 1/2013 | Noone | ............ | G07C 9/00 250/340 |
| 2013/0290054 A1 * | 10/2013 | Jung | ............ | G06Q 50/08 705/7.15 |
| 2014/0023233 A1 * | 1/2014 | Stefanovic | ............ | G08B 13/19608 382/103 |
| 2014/0278742 A1 * | 9/2014 | MacMillan | ............ | G06Q 30/0201 705/7.29 |
| 2014/0355829 A1 * | 12/2014 | Heu | ............ | G06K 9/00778 382/103 |
| 2014/0375454 A1 * | 12/2014 | Konrad | ............ | G08B 13/248 340/552 |
| 2016/0078323 A1 * | 3/2016 | Mikiyas | ............ | G06K 9/6282 382/103 |
| 2016/0110613 A1 * | 4/2016 | Ghanem | ............ | G06K 9/00778 382/103 |
| 2017/0068970 A1 * | 3/2017 | McCormack | ............ | G06K 9/00362 |
| 2017/0161562 A1 * | 6/2017 | Astrom | ............ | G06K 9/00771 |
| 2017/0278264 A1 * | 9/2017 | Liu | ............ | G06T 7/70 |
| 2018/0005048 A1 * | 1/2018 | Ding | ............ | G06K 9/00785 |
| 2018/0011463 A1 * | 1/2018 | Chowdhury | ............ | G06T 7/70 |
| 2018/0018509 A1 * | 1/2018 | Zhang | ............ | G06K 9/00348 |
| 2018/0060672 A1 * | 3/2018 | Takeda | ............ | G06K 9/00771 |

* cited by examiner

METHOD AND SYSTEM TO COUNT MOVEMENTS OF PERSONS FROM VIBRATIONS IN A FLOOR

CROSS REFERENCE TO RELATED APPLICATIONS

This application claims priority to U.S. Provisional Application No. 62/444,841 filed Jan. 11, 2017. Each patent application identified above is incorporated herein by reference in its entirety to provide continuity of disclosure. Furthermore, where a definition or use of a term in a reference, which is incorporated by reference herein, is inconsistent or contrary to the definition of that term provided herein, the definition of that term provided herein applies and the definition of that term in the reference does not apply.

STATEMENT REGARDING FEDERALLY SPONSORED RESEARCH OR DEVELOPMENT

Not Applicable

BACKGROUND OF THE INVENTION

Field of the Present Invention

The present invention relates to a device to track movements of persons by analysis of vibrations made by their movements across a floor using a machine learning model.

Background Concerning the Need for the Current Invention

There are many situations where it is desirable to count or keep track of the number of persons passing through a particular space and to determine where they might enter and exit the space. For example, an entrance area may have one passage accessing a subway, one passage accessing a train station and one passage accessing the outside world. To know how many of the persons entering the train station are coming from the subway rather than the outside, it is not sufficient to count the persons passing each portal into the area. It is necessary to track persons crossing from one passage to another.

This could be accomplished by use of cameras with relevant pattern matching software to make the determinations, but use of cameras has limitations in realistic situations. Large crowds may obscure movements, lighting may be difficult or undesirable and there may be privacy considerations in the use of cameras. Cameras can also be defeated or covered by persons with malicious intentions or vandals.

An alternative way to accomplish this goal is to sense the vibrations made by persons passing and to extract patterns from these vibrations that track the progress of persons in crossing the area. Because the path taken may be complex and because there may be many persons in the area simultaneously the pattern of vibrations may be complex and the manual development of rules to interpret such vibrations may not be possible.

Background Concerning Existing Technologies Used in Embodiments

Pattern Recognition Systems

Pattern recognition systems and software are available in the market place. One example, the Neural Network Toolbox available with the programming system Matlab available from Mathworks is suitable to implement most of the embodiments in this application. It can generate a neural network pattern recognition engine and provide tools for easily training and operating the network. More complex embodiments and especially embodiments where the purpose of the embodiment requires extreme reduction of false positive and/or negative results may be easier to develop with more advanced but market available tools.

Many other open and proprietary pattern recognition and neural network programming libraries and systems are available. The use of these systems is now widely taught and development of specific applications to identify patterns of sensory input is a widely held skill.

Operating a pattern recognition system starts with of building a recognition engine usually a neural network and compiling it into a runnable version. The basic embodiments described below will usually not need a carefully designed or extensive system. A few layers and a small number of neurons should be sufficient. This can be done with a few statements in the tools described above.

The next task is to acquire a set of input data with enough cases to distinguish between the different input possibilities. This data needs to have known outcomes for the input cases and is used to train the pattern recognition system. For embodiments based on training prior to use of the system a number of cases numbering from a few hundreds to several thousands would be sufficient for ordinary uses. The data can be collected by various means but would ordinary be gathered by recording the sensor data and outcomes as trial users go through as many scenarios as possible.

The training data is applied to the pattern recognition in the training process. This may be more computation intensive than the pattern search process itself so is often done in advance on a one-time basis. In other embodiments suitably increased computing power may be employed.

These steps together allow the configuration of pattern search systems to be implemented with standard market available hardware and software and be accomplished by programmers of the usual level of skill in the relevant specialties.

Useful Types of Pattern Matching for the Current Invention

Various type of systems for pattern matching have been developed, but implementation as neural nets are rapidly replacing most older methods because of the straightforward method of development and because of effectiveness. Neural nets require substantial amounts of processing for training but once trained are easily implemented in devices for use and very quick to evaluate particular cases.

The problem to be solved in most embodiments of the current invention is to classify at each time the inputs of the available sensors which have been gathered over a portion of the preceding time periods into two classes based on whether or not a suspected transfer of the token has occurred. Because of this structure of the problem an LSTM or GRU recurrent layer is appropriate. This allows for learning to take into account both short and long-term time based features of the sensor input.

Implementation of neural networks and other structures for pattern matching is now a well-known art. Courses for teaching the methods needed are available online to be audited by anyone at Stanford University and MIT. Course assignments are comparable in complexity to the required effort to implement most embodiments of the methods herein.

An important advantage of pattern matching by neural network is that it is not necessary for the implementer to understand or find patterns. The task in designing such a system is to provide a rich source of inputs that are correlated with the desired states to be distinguished. The correlation does not have to be with each input but can be with an unknown function of many inputs.

An important problem to be solved in most embodiments of the current invention is to classify at each time the inputs of the available sensors which have been gathered over a portion of the preceding time periods into classes based on whether or not specific classes of movements have occurred and gathering parameters of any such movements. Because of this structure of the problem an LSTM or GRU recurrent layer is appropriate. These layers are well known structures by persons skilled in development of neural networks for solution of problems with data in the time domain. This allows for learning to take into account both short and long term time based features of the sensor input.

Pattern Matching for Acoustics

Methods for methods for detection of acoustic scenes and events have become well known in the artificial intelligence community. Many papers and explanations of such methods are available from the Proceedings of the Detection and Classification of Acoustic Scenes and events 2015 Workshop (DCASE2016) held by the Tampere University of Technology of Finland. The kinds of events to have patterns recognized in the tracking of possession of tokens are of the same structure as acoustic events and can be handled by the same methods. It would often be helpful to make simple adjustments in the methods such as adopting an appropriate time scale and adapting the preprocessing to the sensors used. These papers demonstrate the feasibility of identify and tracking sources and events on the basis of acoustic inputs. They also show that preprocessing of the acoustic data streams makes more efficient the generation of machine learning models. They especially show the usefulness of recursive neural model structures in recognizing desired features of the acoustic data and the recognition of specific types of events.

Vibration Sensors

Vibration or Sound sensors are helpful in many embodiments. They can detect patterns such as existence of patterns of movement of persons who might cross an area. They can detect background noise which is correlated with location in many venues. Patterns in background or other noises can be correlated to movement and location in places.

Vibration sensors are a well-developed field of technology. They are available for all frequency ranges, all levels of intensity down to unavoidable atomic noise and with many installation, connection, power and environmental options. There are many common techniques to process the outputs of vibration sensors with either digital or analog processes to provide simpler signals for input to the machine learning model. For example, frequencies may be filtered, the domain may be transferred from the time to the frequency domain, many types of aggregation may be accomplished. These processes make simpler the steps of analysis by a machine learning system to be described below, but do not involve machine learning themselves.

Background Concerning Machine Learning

Machine learning is a well-developed and understood method of creating devices that are capable of solving problems that defy development of programmatic solutions that rely on understanding in detail the working of the system to be analyzed. A famous example is the modern language translation systems widely used on personal computing devices. Development of programs to translate languages has produced poor results because of the complex and subtle structure of human languages and the scale of the problem. But systems have been developed to be trained on a large (possibly hundreds of millions) number of examples of language usage. The trained models are then applied to an input in one language and provide output which is very likely to be a satisfactory translation in another language of that input.

Machine learning systems are very different from computers running programs written to model problems to be solved. While the implementation of a machine learning system may be made by means of a computer program, this is not the only way to implement machine learning models. An array of analog devices (usually called gates) can implement the model in a massively parallel way. Rather than containing a program, a machine learning system constructs a model which transforms an input through a huge number of gates to produce an output which has a statistical meaning. The operation of the gates is modified in the training steps until the behavior of the model converges on a tendency to produce desired results.

Machine Learning System Models

A machine learning system model or just "model" as used in this specification and in the claims is a large set of parameters represented as data or physically and arranged in such a way that they can be adjusted by a training process based on a collection of data that represents the system being modeled. The model also allows inputs that represent a particular state or set of states of the system to be analyzed by use of the model. The use of the model transforms the inputs into a set of outputs that constitute an analysis of the states being analyzed.

A model can be applied to a set inputs by means of an algorithm executed by a processor or by means of a physical analog device to perform the transformation. The algorithm or device is only the means of evaluation and is distinct from the model which is the set of trained parameters and the structure in which they interact.

Typical models are arranged in layers in a way so that in a given layer inputs are processed by the model to produce outputs from that layer to be given to the next layer. The information in general flows from layer to layer with little or no connection back to earlier layers. While there are exceptions, especially with systems that use recursion to allow handling of time series in input data, this one way flow give meaning the layer concept. The concept of layers is separate the training concept of levels although in many cases a particular level of training is applied to only specific layers to develop their abilities and additional layers are added for training in later levels.

Training a Model

In this specification and in the claims the process of training a model consists of applying data representing possible inputs to the machine learning system with the model in its current state of possibly partial training. The outputs of the system are used to generate incremental adjustments to improve the transformation of the inputs into outputs better representing the desired behavior of the system.

The usual way to determine the adjustment to be made to the model for each group of inputs presented is to calculate or measure the effect on the outputs of each parameter in application of that set of inputs. If the effect is favorable in providing outputs that correspond as wanted to the inputs supplied then the parameter is very slightly augmented to improve the overall behavior of the model as trained.

There are many ways to accumulate the data sets used for training. One way is to find or set up a large number of examples with known outcomes and collect the data from them. Another way is to write an algorithm which generates examples. The examples can be graded by people or the generation method may be able to predict the outcomes. Some problems are easy to solve in reverse; i.e. a set of inputs may be easier to get from a assumed output than to find the output from a set of inputs. For example, to train a system to distinguish pictures of dogs from pictures of cats one can get pictures from public sources such as the internet and use humans to label the species depicted. That set can be used to train a model which can test other pictures.

Convergence

The training process is continued for each item in the training set data. Because it is important that training result in a stable and gradual progression of the model toward the desired behavior teach round which uses the set of training data items only changes the model by a small increment. The rounds are repeated many times and the results are compared to data reserved for testing in order to measure the effectiveness of training. If the structure of the model is well chosen than parameters will converge on values that produce the desired outputs for various input sets.

Training in Levels

The training is typically accomplished in multiple states called levels and described below. Convergence is accomplished at a level and then the model trained through that level can provide suitable inputs for training in later levels.

BRIEF SUMMARY OF THE INVENTION

The current invention comprises a method and a device for executing a count of persons crossing a floor by detecting vibrations in the floor produced by the persons. The vibrations are in an area connecting a multiplicity of passageways and the vibrations are analyzed by a machine learning system with a model which may be trained in multiple stages. The system may identify persons from patterns of vibrations and determine that a particular person has produced vibrations at different times and places. The system identifies the entrance and exit of persons by particular passage way and uses the correlation of entrance and exit detections of a particular person to make the count.

Various embodiments and claims restrict the count to identified persons or persons who are in a portion of the monitored floor at certain times. Both the method of counting from vibrations and systems which implement that method are claimed. The machine learning system may be restricted to one trained in stages or levels. It may be organized in layers. Layers or levels may be concerned with events based on timing or frequency, on identification of persons or on other structures of the vibration patterns.

BRIEF DESCRIPTION OF THE SEVERAL VIEWS OF THE DRAWING

The features and advantages of the various embodiments disclosed herein will be better understood with respect to the drawing in which.

DETAILED DESCRIPTION OF THE INVENTION AND EMBODIMENTS

Definitions

Figure 1:
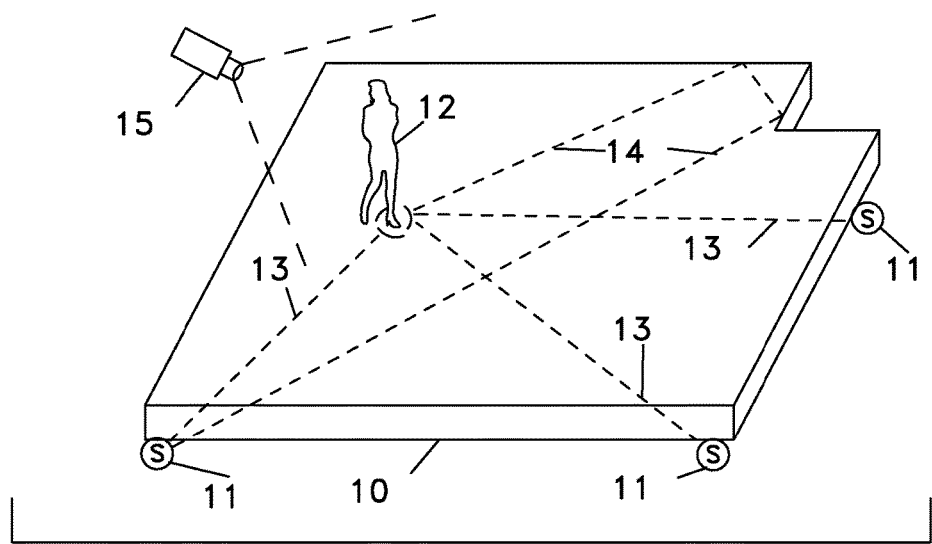
FIG. 1 is a view showing the operation of a simple system to determine the movements of a person from vibrations in a floor.

The definitions given in this section are intended to apply throughout the specification and in the claims.

A machine learning model is a data structure such as a neural net which has been trained to process inputs to recognize significant patterns.

A layer of a machine learning model is a portion of the model with inputs from input data to be evaluated and/or from previous layers of the model and with outputs from the model or to later layers of the model A level of a machine learning system is a group of training operations which enable one or more layers to produce outputs which have a pattern correlated to the inputs which provide inputs for further processing or for output from the system. A subsequent level of training would use these outputs as inputs to one or more layers to produce outputs from levels trained by the subsequent level to provide further analysis.

Sensors

There are many kinds of sensors available on the marketplace which can provide information to train a pattern recognition system or to be examined for patterns. Some of these examine the immediate situation at the identity token and measure factors such as acceleration including the direction of gravity, rotation, and even temperature. Others are active or passive devices to measure available information about the environment. They can work by a wide variety of information transmission modes such as infrared, radio, capacitance, visible light, sound or other means.

Small, fast and cheap three dimensional accelerometers are widely used and available in the market place. They can provide a rich amount of data as a function of movements in each plane and about orientation relative to gravity. In an application where one hundred percent accuracy is not necessary, they will allow simple designs for identification devices. An accelerometer can also be used to communicate with a device by means of moving the device in predetermined patterns to change modes, set parameters, etc.

Gyroscopes which measure the rate of rotation in one or more planes are also available and provide a substantial amount of additional information. They are able to work in a sealed device, as are accelerometers and various other types of sensors. Working in combination with accelerometers, gyroscopes can distinguish angular rotations in vertical and horizontal planes. The patterns of movements in various planes are a rich source of patterns which can be used to distinguish transfers of an object between different persons and mere movements by a single object possessor.

Sound and vibration sensors are helpful in many embodiments. They can detect patterns such as existence of conversations between persons who might transfer a token. They can detect background noise which is correlated with location in many venues. Patterns in background or other vibration can be correlated to many categories of useful information. Various categories of vibration generation and modification are important in providing such information. One category is vibrations which are generated by objects of interest, another category is vibrations which have been modified by environmental conditions to yield additional information and a third category is background vibrations which can provide information for comparison and can be modified by objects of interest to provide information about these objects. An example of the second category is the comparison of direct and reflected receipt of a vibration by a sensor to indicate the location of an object. An example of the third category is object location by detection of background vibrations scattered by that object.

Pattern Matching Software

Various type of systems for pattern matching have been developed, but implementation as neural nets are rapidly replacing most older methods because of the straightforward method of development and because of effectiveness. Neural nets require substantial amounts of processing for training but once trained are easily implemented in devices for use and very quick to evaluate particular cases.

The problem to be solved in most embodiments of the current invention is to classify at each time the inputs of the available sensors which have been gathered over a portion of the preceding time periods into two classes based on whether or not a suspected transfer of the token has occurred. Because of this structure of the problem an LSTM or GRU recurrent layer is appropriate. This allows for learning to take into account both short and long-term time-based features of the sensor input.

Implementation of neural networks and other structures for pattern matching is now a well-known art. Courses for teaching the methods needed are available online to be audited by anyone at Stanford University and MIT. Course assignments are comparable in complexity to the required effort to implement most embodiments of the methods herein.

An important advantage of pattern matching by neural network is that it is not necessary for the implementer to understand or find patterns. The task in designing such a system is to provide a rich source of inputs that are correlated with the desired states to be distinguished. The correlation does not have to be with each input but can be with an unknown function of many inputs.

Pattern Matching for Acoustics

Methods for methods for detection of acoustic scenes and events have become well known in the artificial intelligence community. Many papers and explanations of such methods are available from the Proceedings of the Detection and Classification of Acoustic Scenes and events 2015 Workshop (DCASE2016) held by the Tampere University of Technology of Finland. The kinds of events to have patterns recognized in the tracking of possession of tokens are of the same structure as acoustic events and can be handled by the same methods. It would often be helpful to make simple adjustments in the methods such as adopting an appropriate time scale and adapting the preprocessing to the sensors used.

Training in Levels

Models can be arranged in levels both for training and for evaluation of inputs. The application of the model to a set of inputs generates outputs that describe in a higher level of generality the meaning of the inputs. Those outputs can become inputs to further structure which is a model for a more general transformation of the original inputs toward meaningful outputs.

In this specification and in the claims, a level of training is the training of a portion of the parameters of a model to produce outputs that are trained until a state of convergence is attained and made available for input the next portion of the model. That is, distinct levels are made distinct by separate training to convergence. It is possible to simultaneously train multiple levels, but they are distinct levels when they are separately tested for convergence. A level that is not tested for convergence, but which uses inputs from a level that has been brought to convergence is a distinct level from the level providing the inputs.

Typical models are in at least four levels. The first which here is called the Basic level takes raw sensor input and describes it in terms directly definable based on the input data. Examples would be detection of edges from visual data and of tones, harmonics and burst timings for audible data. The second level which is here called the General level is to identify objects and events from the output of the first level. Examples would be to detect a person crossing the path of the sensor or identifying a sound as a gunshot or crowd noise. The third level, herein called the Specific level is to allow the model to identify actions and objects appropriate to the purpose of use of the model. Examples of this level include model layers to implement steering or acceleration of a vehicle or determination of compliance with a standard in a specific type of situation. There is also a fourth level called the In-Use level in many implementations. This level incorporates data collected while a model is in use which modifies the model to allow evaluations at a later time to take into account earlier inputs or evaluations where a series of evaluations is made.

Implementation of Training on a Processor with a Memory

Training requires a very large amount of processing to apply the large amount of data in the training set repeatedly to incrementally cause the model to converge on the desired behavior. If the adjustments from one pass through the data are too large, then the model may not converge or may not allow the effects of all of the inputs to diffuse through the model structure and correctly operate. For this reason, specialized very powerful processors are used for training. They are not appropriate for incorporation in portable devices because of considerations of size and expense.

Basic Training

In this specification and in the claims, basic training refers to training which is used to interpret inputs from sensors or raw data from data sources to identify aspects of objects and actions treated as objects that are implied by the data and too general in nature to identify the potentially detected objects at this stage. Examples include edge detection, categorization of sounds by location of the source, face detection, orientation in space, counting objects, elimination of backgrounds and many other general tasks of interpretation.

A portion of a machine learning model with this training can be used for many applications and could be supplied by a specialized developer. It's training would be brought to convergence and the outputs supplied to the next level of training when the model is used to evaluate inputs either for further training of other levels or in actual use.

Data for General Training Describing the Area of Application of a Model

In this specification and in the claims, general training refers to training which is accomplished after a model has received basic training. The general training uses data that is representative of members of classes of objects which are to be identified by the use of the generally trained model. The focus of general training is to identify specific objects and actions in the general classes. Examples of data and training for the current application include identifying footsteps, persons, location patterns and details of such entities that are part of a signature of a specific member of these classes.

Transferring a Trained Model

It is well known in the art of developing machine learning models that training the model requires much more time and processing power that using a model to evaluate inputs. Because training only has to be done once or a limited number of times and many evaluations can be performed by the same trained model, it is practical to use specialized powerful processors over a long period of time to do the training; and then to download the model to a compact processor that can be taken to the place where evaluations are wanted and to perform evaluations to be used in real or limited time.

Data for Detecting Movements and Identify of a Person with a Trained Model

Data for detecting specific activities or objects can be gathered by a sensor after the model is downloaded to a evaluating processor. The data can be preprocessed by means other than machine learning models. Both analog an digital preprocessing based on understanding of the nature of specific collected signals will produce inputs that are more easily processed by the machine learning model. Even the early layers of the model can be so simplified. As the data is processed into inputs for detection of complex and subtle patterns, use of machine learning models becomes the most or only practical way to continue toward the desired outputs. This is especially true when the is not available human understanding of the details of pattern identification and so that specific algorithms cannot be manually created.

Acquisition of In-Use data with a sensor for further training.

While training as described above may require special processors the fact that training can be organized in levels and the model in layers allows additional training of some layers in a level implemented after the model is transferred to the evaluation processor. The training can be done with data acquired at a late time. This data is referred to as in-use data. This allows training for patterns associated with specific persons. This limited amount of training may be practical for implementation on a processor sized primarily for the evaluation function.

DETAILED DESCRIPTION OF THE DRAWING AND CERTAIN EMBODIMENTS

Referring to FIG. 1.

FIG. 1 depicts an area where pedestrian traffic is analyzed by vibrations set up in the floor is shown. A slab 10 forming the floor is shown. The slab could be a monolith as shown or could be sectioned. Reflections from seams where sections join and other vibratory phenomena enrich the vibration patterns. Three sensors 11 are shown. The timing of vibrations reaching various sensors 11 can indicate the location of the vibration source.

Pattern analysis by means of a neural net does not require understanding by the implementer of the particular patterns being recognized, but understanding of the type of patterns can be useful. In the current case preprocessing in early layers of the neural net or in dedicated circuitry can make the developing an accurately converging neural net much easier. Inputs at a certain layer of the net can represent signals with defined delays between different pairs of sensors.

In the depicted embodiment vibrations or acoustic signals 13 are shown from the footstep of a person 12 radiating to the three depicted sensors. One signal in particular 14 is shown reflecting in two bounces to join with a direct signal at particular sensor. Complexity in the reflecting surfaces enriches the patterns in the sensed vibrations which assists the neural network in finding the needed patterns.

FIG. 1 also depicts a camera 15 which is used in creating the data to be used in training the machine recognition model for this system, but which is not used in actual operation of the system.

Figure 2:
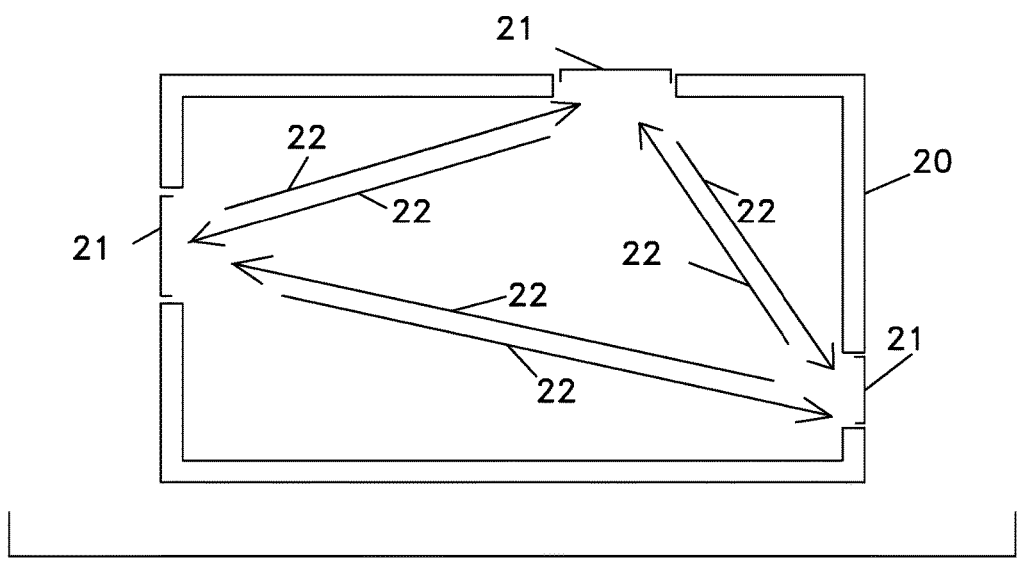
FIG. 2 is plan view of a crossway where movements of persons may be tracked.

Referring to FIG. 2

FIG. 2 depicts an entrance hall 20 is shown with three portals 21. Traffic can potentially go from any portal to any other portal for a total of six paths 22 through the entrance hall. If the floor of the hall is provided with sensors as in FIG. 1 a pattern matching network can be arranged to provide an output for each person traversing a particular path. These outputs can be summed to determine the number of persons entering or leaving area accessed by the hall. There may be multiple such halls accessing an area of interest and the detected activity from several halls can be summed to provide information on the number of people in total in an area.

Figure 3:
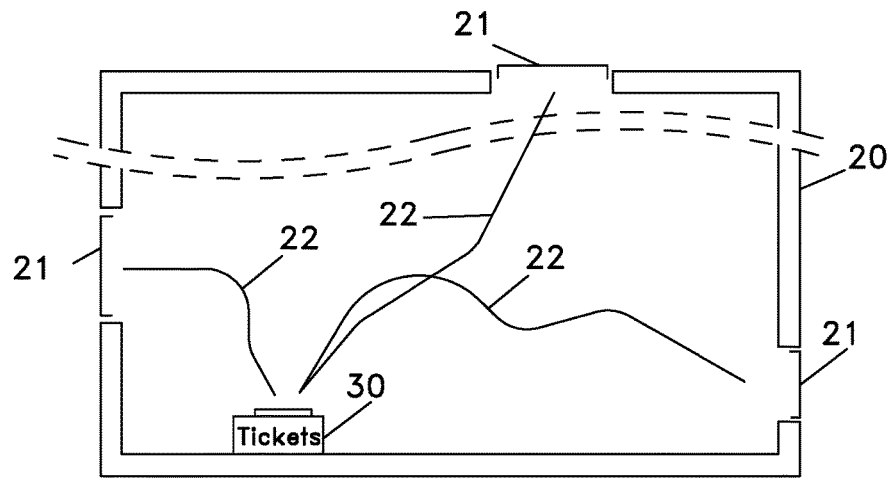
FIG. 3 is a plan view of an embodiment where persons access a machine in the monitored area.

Referring to FIG. 3

In FIG. 3, a hall is shown with an interactive kiosk. The operators of the kiosk are interested in counting the users by the entrances they use to approach the kiosk. For example, if the kiosk is a ticket selling machine in a train station, the operators may be interested in whether the buyer has arrived on a train or is a person who has come to the station by another mode of transport. This may be indicated by the passage used to enter the hall.

A hall 20 similar to that of FIG. 2 with three entrance/exit passage ways 21 is shown. In the current embodiment the halls is associated with train service, a ticket machine 30 serves patrons who wish to purchase tickets for future trains. The patrons can come and go by any of the passageways on a variety of paths. Some simple paths are depicted 22 but much more complex paths may happen especially if patrons are meeting other persons or using other services. The operator of the hall which here is the railway company wishes to determine patterns of ticket purchase to improve service and uses the current invention to determine if persons are buying tickets as they enter trains, exit trains or come to the station at another time. This pattern is correlated with the movement patterns of the ticket buying patron.

Figure 4:
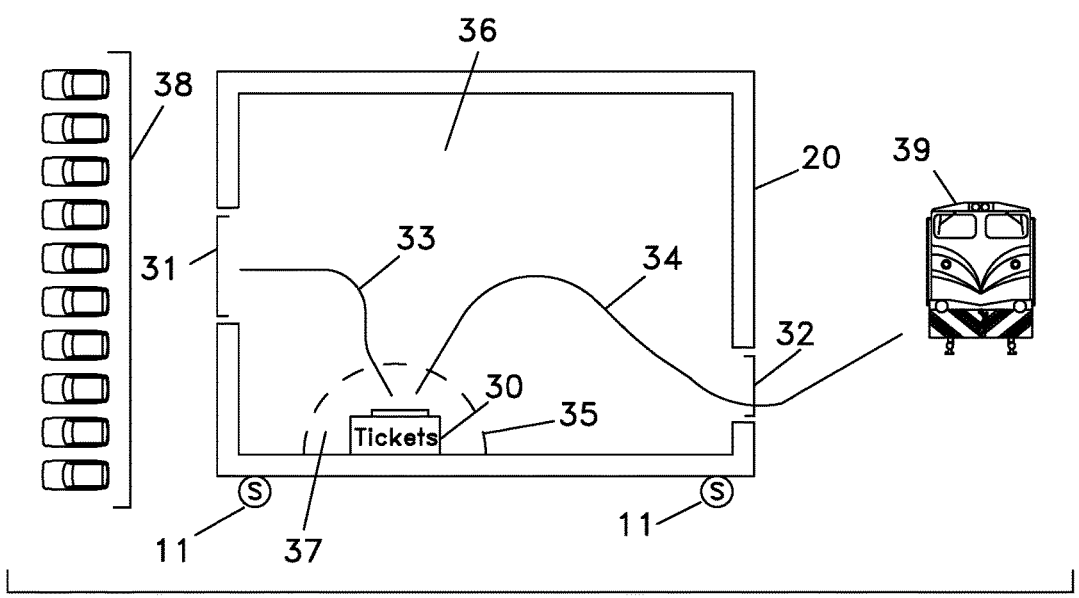
FIG. 4 is a plan view of an embodiment with two entrances showing interaction with an activity in the monitored area.

Referring to FIG. 4.

An area 20 similar to FIG. 2 is shown which is divided into two sections. In the current case the area represents an entrance hall to a small train station. A larger section 36 is shown which has two entrances. One of the entrances 31 leads to a parking lot 38 for customer vehicles. The other entrance 32 leads to tracks 39 with train service to other stations. A smaller portion of the hall 37 is designated as a separate area. The line of division 35 functions a a third portal serving the main area 36. Crossing this line is counted as entering or exiting the main area by a third entrance. That is, the area 36 has three entrance and exit portals 31, 32 and 35. In the current case a ticket machine 30 is shown in the small portion.

The purpose of having the depicted embodiment in the current case is to track the patterns of travel of customers buying tickets. In particular to distinguish between customers who enter from the lot 38, pass by path 33 to the ticket machine and then return to the parking lot from passengers who enter from the parking lot, buy a ticket and then use path 34 and portal 32 to take a train immediately. It may not be sufficient to correlate tickets sold to tickets used because the tickets of interest may be for future travel.

The sensors 11 of FIG. 1 can be used in the embodiment of this figure and serve to provide information from the entire hall 20 with its two contained areas 36 and 37. The demarcation line 35 between the two areas may not have any physical or visible features but may be established in the software doing the analysis of vibratory signals. An ability to detect the location of origin of a signal may be sufficient of establish the demarcation and the establishment of three portals. Similar virtual portals may take the place of the physical portals in any combination of entrances or exits. Such portals do represent physical locations but physical features marking or implementing such portals may not be necessary.

In another embodiment depicted in FIG. 4 a person entering may be tracked in position without establishing a virtual portal because the tracking may not be continuous. That is the boundary 35 shown in the figure cannot be kept and is not used in this embodiment. If the portal of the remaining two 31 and 32 used for entrance and exit and the person can be identified in performing a activity of interest such as buying a ticket at the machine 30 then the system would still be able to generate a relevant count based on vibration tracking. This identification may be on the basis of the person being in an area adjacent to the ticket machine during a time interval in which a ticket was purchased.

Figure 5:
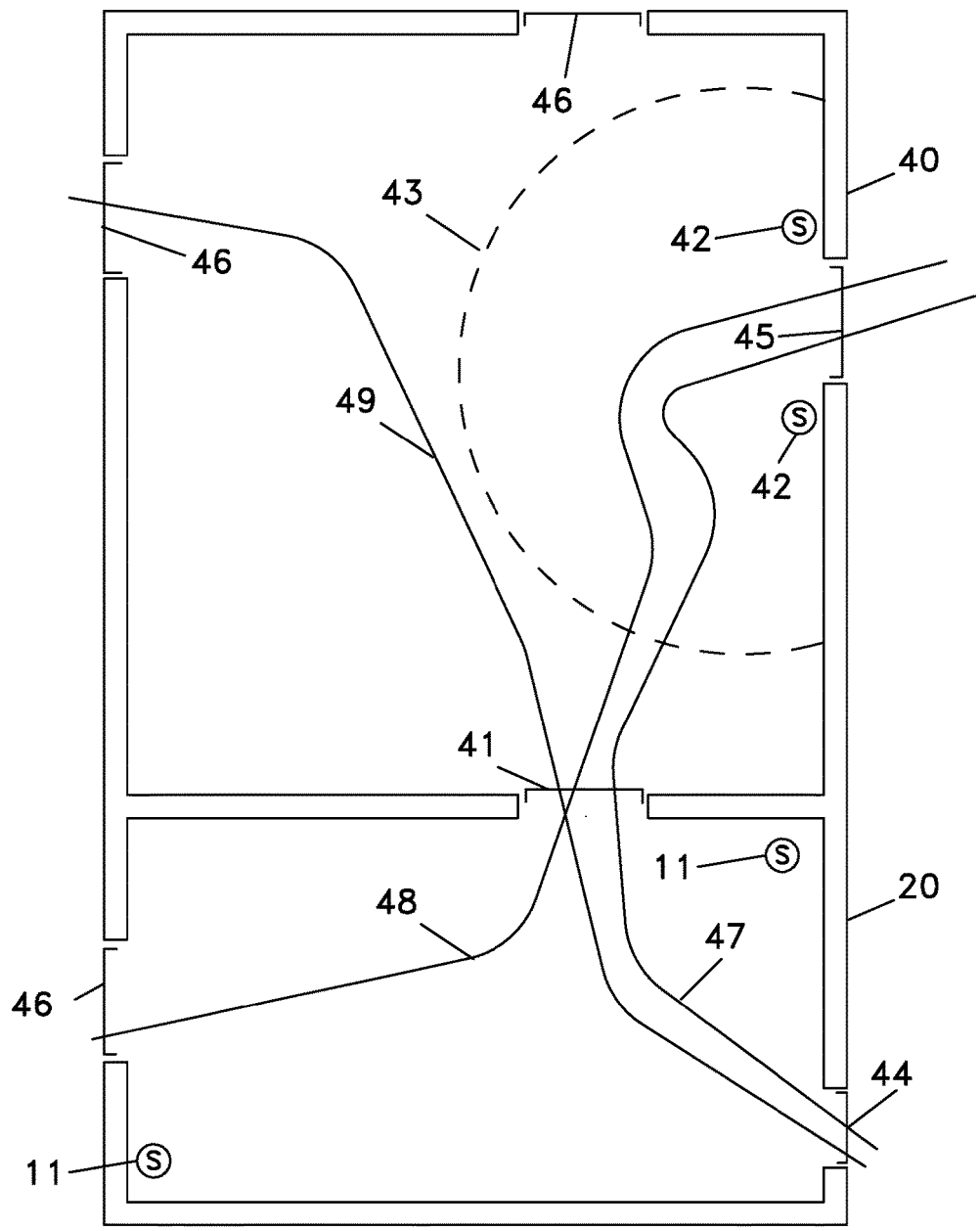
FIG. 5 is plan view of two rooms where tracking occurs in two disconnected areas.

Referring to FIG. 5.

In FIG. 5 the area of FIG. 2 is shown with the addition of a second room 40. The tracking by sensors 11 in the first area 20 does not cover persons once they pass through the passage 41 to the second room. Additional sensors 42 are designed to monitor a secondary monitored area 43 within the second room. A vibrational pattern or signature is collected from a person tracked by sensors 11 in the first area and is used to identify the same person on entry to the second monitored area 43. In the depicted embodiment, the system is used to count persons who enter through a specific passageway 44 and leave through a second designated passageway 45; the two passageways may be the same or different. Such persons by matching of the signature and tracking in the second monitored area be distinguished from persons who use either of the designated passageways but enter or exit through other undesignated passageways 46. Thus, persons traveling path 47 are counted but persons traveling paths 48 or 49 are not.

Figure 6:
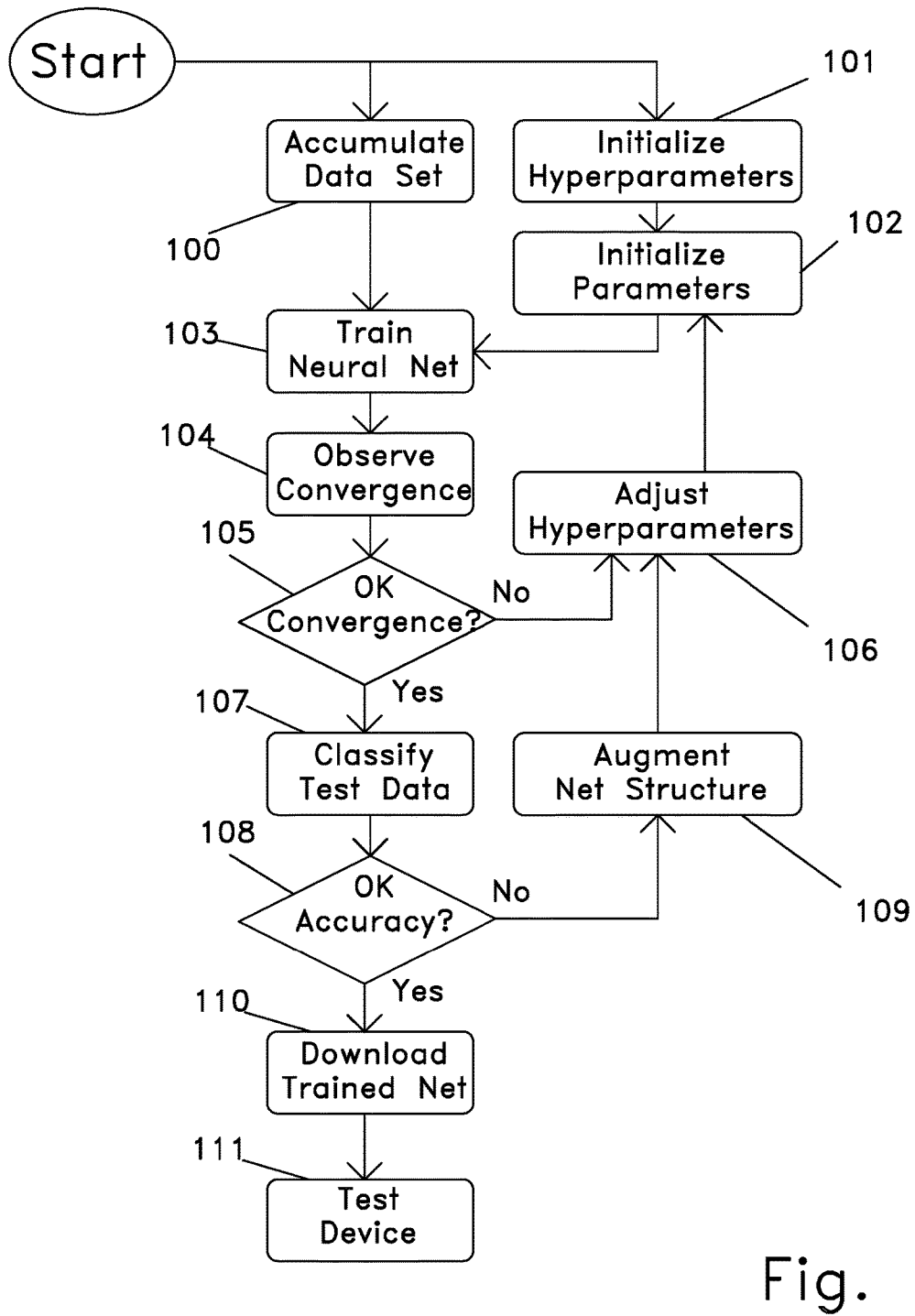
FIG. 6 is a diagram of the steps in developing and implementing the pattern matching software of the embodiment of FIG. 2.

Referring to FIG. 6.

In FIG. 6, a diagram of the process for developing the pattern matching software for the embodiment of FIG. 2 is shown. The software to be developed is a recurrent neural net with an input layer, a recurrent layer, a additional fully connected hidden layer and an output layer. Other more complex structures are also easily implemented but this structure would be sufficient for the low level of accuracy needed in this embodiment.

The first step of the development is to accumulate 100 a data set for training and testing. While unlabeled data can be used for most or all of the development of a model for a machine learning system, it is much more accurate and efficient to use labeled data, where each section of sensor data is accompanied by data pre-interpreting the meaning of the particular piece of data. In FIG. 1 a camera 15 is shown which can be used to gather data for use in creating such labels. The camera data can be interpreted manually, by means of pre-existing trained models for analyzing movements of persons from camera data, or by machine learning analysis of the as yet unlabeled data.

In the depicted training scenario, the camera observes a large number of persons crossing the area to be monitored by the system. The data collected by the sensors (FIG. 1 n. 11) is labeled with the use of the camera 15. A number of different persons follow different paths and use different portals (FIG. 2 n.21) to the monitored area. The paths are reported the labeling process. Other data such as time in the area and observation of congestion and space use efficiency can be collected and added to the training data. As many as possible scenarios and situations are included. A data set with a few thousand or so persons entering the area with a reasonable variety of paths should be sufficient for many embodiments such as here described. The data is divided into two sets with a larger portion for training and a smaller portion for accuracy testing. This is considered labeled data because it contains both input (sensor) data and the desired output for that data (presence or absence of transfer).

In this and related embodiments, a step in the development which might be started in parallel with data collection is the design of an appropriate neural network. The sizing of the layers and the setting of various factors in the neural net which are in addition to the factors and values (parameters) that are adjusted in training are collectively referred to as hyperparameters to distinguish them from the "parameters" which are adjusted in training the neural network. The hyperparameters are initialized 101 to appropriate values. In some systems that are taught hyperparameters are adjusted during the course of training but are distinct from trainable parameters because the adjustments are on the basis of the progress of the training rather than being direct functions of the data.

The next step is to initialize 102 the parameters which are to be trained. Appropriate initialization is necessary for reasonably rapid convergence of the neural net. A number of techniques are taught to product an initial set of values which produced good training progress.

The network is then trained 103 by passing data set items through the network as implemented on a training processor. Because training requires larger processing power and time than use of the network after training special powerful processors are used for this step. The training process adjusts the parameters incrementally on the basis of the output of the neural network. The hyperparameters specify the methods of calculating the adjustment to parameters. Generally the output of the network is used to back propagate through the network to provide further input to the adjustments. The items in the training portion of the dataset are used repeatedly while the convergence of the network is observed 54 by processes in the training data processor.

If the convergence is judged 105 not to be adequate the training is stopped, the hyperparameters are adjusted 106, the neural network is reinitialized and the training process is repeated until satisfactory convergence is obtained. The smaller portion of the data set which has been retained and not used for training is then passed 107 through the neural network (classified) and the output is checked 108 for accuracy. If accuracy is not sufficient for the goals of the particular system being developed then the net structure is made larger 109 and the training process is repeated until satisfactory accuracy is obtained.

The trained neural network is then downloaded 110 to the target device, which is then ready for system testing 111.

Figure 7:
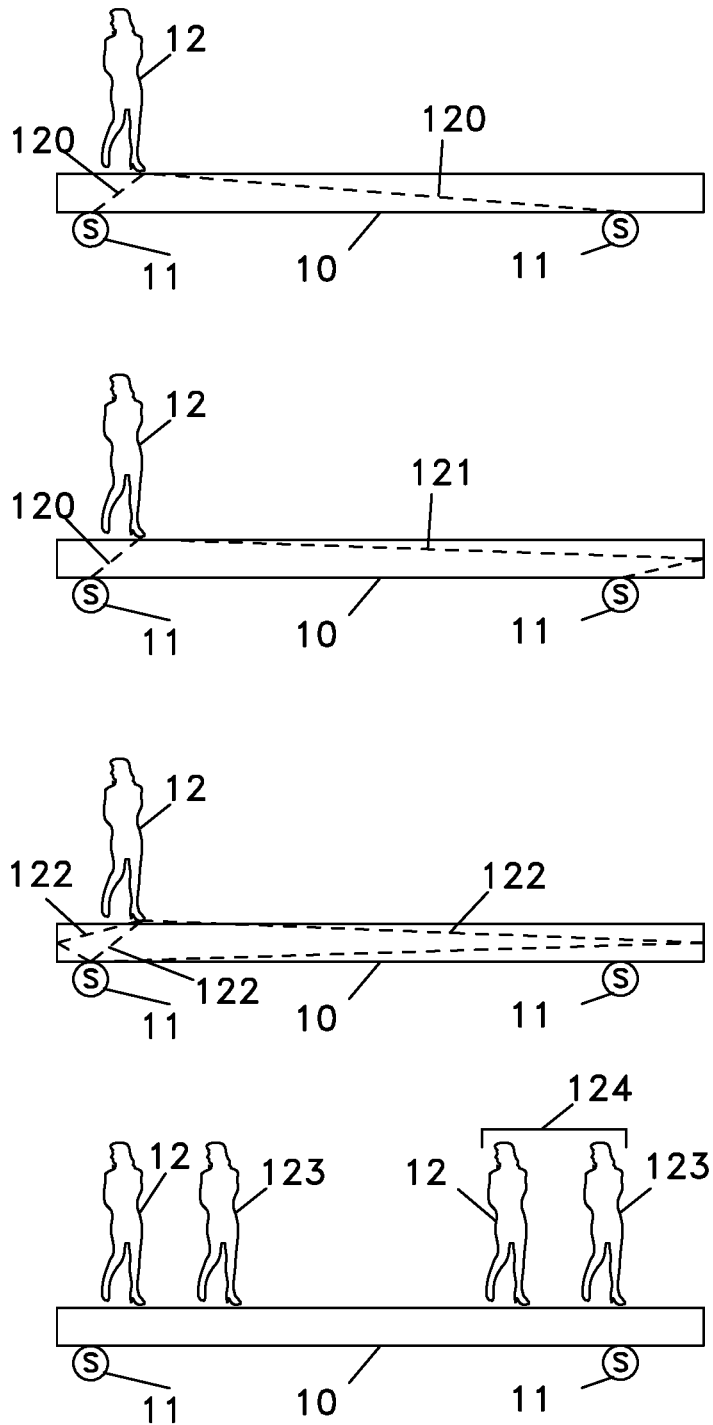
FIG. 7 depicts various types of data that may be collected by vibration sensors in a floor.

Referring to FIG. 7.

In FIG. 7, various types of data that may be collected by vibration sensors in a floor are depicted. The floor slab 10 of FIG. 1 is depicted with a person 12 walking on it. The descriptions for this figure describe how information collected by the sensors would be handled by geometric and physical analytic methods. The pattern matching methods of a machine learning model would accomplish the same types of analysis allow further pattern matching operations to identify implications of the locations and actions creating these vibrations.

Vibrations caused by the impact of the persons feet may travel directly to sensors 11 over straight paths 120. Simple calculations from the time of arrival of the vibrations at the various sensors allow determination of the location of the impact. Where a vibration travels a reflected path 121 to the sensor, then a more complex calculation is required but, with the exception of degenerate points, source location is still possible. It should be noted that a machine learning program would be able to distinguish the various modes after training with varied examples.

Where multiple vibrations 122 from the same source in time and space arrive with varying delays even at a single sensor. Location in multiple dimensions may be possible. Training may enable the machine learning system to distinguish the various paths based on not only signal delay but other factors such as attenuation, spread of signal details and effects of the reflection process.

Where a person 12 moves to another position 123 with one or more steps there may be characteristics such as distance traveled in a step, timing of steps or specific details of the sounds as processed from inputs to a machine learning system. If that person's identity is lost to the system by complex movements, leaving a monitored area or by interference it may be regained by identification of such characteristics. In the figure the person makes a similar move in another area 124 at a later time and the machine learning system reidentifies the person.

Figure 8:
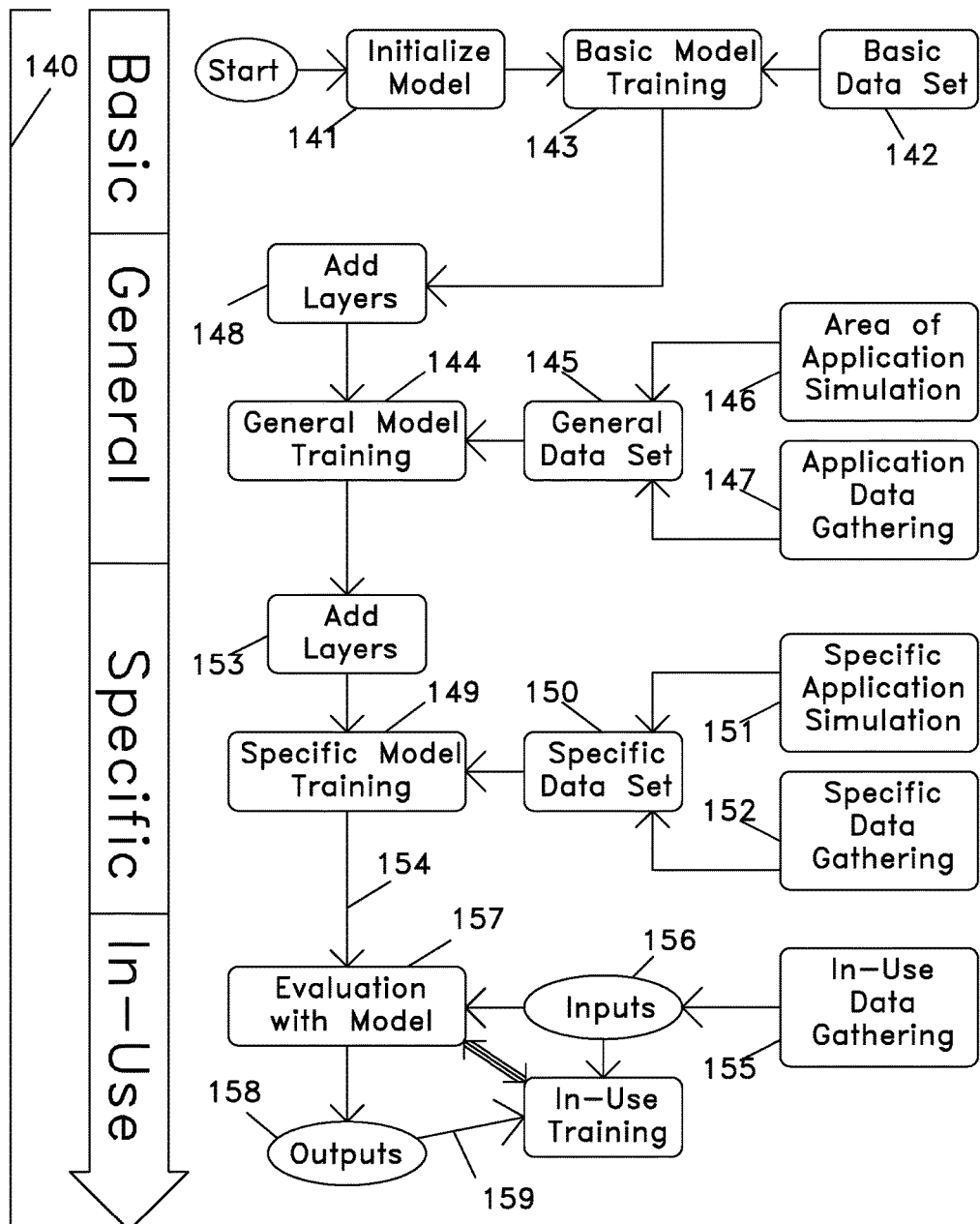
FIG. 8 is a diagram of the process of training in levels.

Referring to FIG. 8.

In FIG. 8, the process of training in levels is depicted. The training and operation steps of the model used to evaluate vibrations in a floor is shown. This diagram is intended to show the relationships between different levels of training of a model each of which builds on the levels below. The flow of the training and application of the model are shown by the arrow 140 which diagrams the levels of training. As stated above the model and the machine learning implementation in arranged in layers, but the training is described as occurring in levels. In general the levels correspond to layers or groups of layers of the model, but the correspondence is not necessarily one to one. The main diagram of the figure shows the detailed steps. The description is for a general neural net type of model. Other model types can follow the same general flow and neural nets can incorporate implementation details not shown. The model generally has layers which are arranged in the same order as the training steps and when a particular level of the model is being trained, data is evaluated by the earlier levels of the model which have already had training to provide inputs to the level being trained.

The model is initialized 141 with suitable values in a trainable parameter set. A basic data set 142 with basic information is used to perform the first level of training 143 the model. The model would generally already have multiple layers and the basic data set would be used to train the earliest layers of the model. It would use data to allow these layers to recognize or react to features such as edges in pictorial data and sound impulses for audio data. This training would be applicable to many applications of a machine learning system. It would provide a layer of the model with an ability to recognize features such a burst of acoustic noise and determine acoustic features and localization. Higher level interpretation to distinguish physical causes such as being a footstep would come at a later layer which would be trained at a later level. It may be provided by a supplier of implementation and hardware systems and these layers may be acquired in an already trained condition by implementators of applications. In the embodiment of FIG. 1 showing a person 12 walking on a floor 10 creating vibrations 13 and 14 which are received by sensors 11, the model would allow processing the output of the sensors to create inputs for layers in the model implementation which create the inputs for the higher or later levels in the model.

The second level of training 144 in the depicted embodiment is done with a second "General" data set 145. This data is selected to allow the model to use inputs to recognize objects and entities relevant to the application of the model. The general data set in the depicted embodiment is generated by a combination of data generation from a simulation 146 of general applications of the model and specific data gathered 147 for such applications. The applications at this level include recognition of objects and events such as persons moving, footsteps, groups moving together, and items used to define a signature for specific persons and other objects of interest as individuals rather than members of types. Prior to the training at this level layers are typically added 148 to the model to allow the training to take effect in facilitating analysis with the aid of the moved based on inputs processed by preceeding levels of trained model. In the embodiment depicted in FIG. 1 the second level would be able to recognise individuals. Recognition here may not produce individual outputs for specific persons, but the patterns in the outputs are correlated to specific persons sufficiently to allow later levels of training to determine patterns of activities of specific persons.

The third level of training 149 in the depicted embodiment is done with a third "Specific" data set 150. In the depicted system this layer and the layer for the second level are separate levels. In some systems the two layer may be combined and the training done concurrently. Multiple adjacent levels can be treated as a single level and trained concurrently or sequentially. This data is selected to allow the model to use inputs to recognize further details and activities of the objects identified in the second level. The general data set in the depicted embodiment is generated by a combination of data generation from a simulation 41 of specific applications of the model and specific data gathered 42 for such applications. Typical information used to generate a simulation at this level include many variations of relevant objects for the purpose of applying standards similar to the one to be implemented. Prior to the training at this level layers are typically added 43 to the model to allow the training to take effect in facilitating analysis with the aid of the model based on inputs processed by preceeding levels of trained model. In the embodiment of FIG. 1 this level is used to train the model to identify the location on the monitored floor of person identified by the second level.

After the model is trained through several levels, it is usually downloaded 44 from high powered training processors which are only used to prepare the model to a smaller portable processor to execute the model in actual use. To use the model to evaluate a situation data is gathered from the situation 45 by means of appropriate sensors and prepared to serve as an input 46 for the model. The model on the basis of (evaluating) the inputs generates 47 outputs 48 corresponding to the action of the training on the parameters of the model.

In some more advanced implementations of the system, inputs and outputs are used to select 49 additional training for the model. The information in the inputs and outputs can cause the download of sets of parameters which can be added to the model or a limited training process similar to that used to develop the original model can be accomplished by the evaluation processor.

Figure 9:
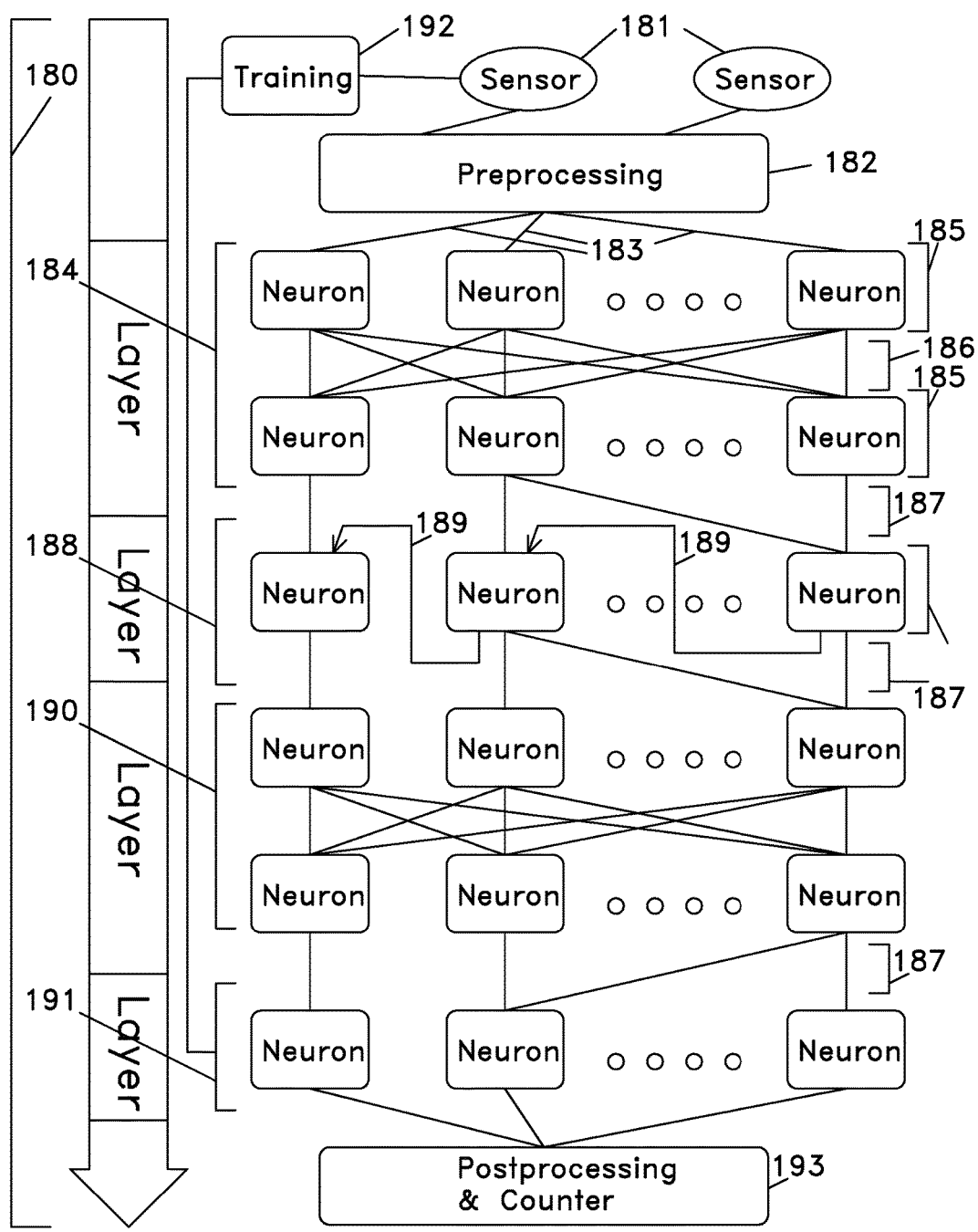
FIG. 9 is a diagram of the operation of a machine model implemented in a neural network.

Referring to FIG. 9 the operation of a machine learning model implemented as a neural network is depicted.

The layers of the model are sequenced as in the arrow 180. In the depicted embodiment there are 4 layers. Sensors 181 detect vibrations to be analyzed an provide signals to a preprocessing unit 182 which applies analog and digital methods to simplify and quantify them for input for evaluation by the machine learning system. Outputs 183 of the preprocessing are supplied as inputs to the first layer 184 of the model. The first layer is implemented in two sublayers 185 which are completely interconnected 186. Typical neural network models have multiple sublayers in each layer and often have complete interconnections. Each interconnection consists of a parameter which determines the strength of the interconnection. Each layer and sublayer consists of a number of neurons Training adjusts the parameters in small increments to cause the model to converge on the desired behavior. A level of training works on a layer or group of layers to produce convergence to the desired behavior for that level. Connections between major layer structures 187 are often much more sparse and are designed to transferred information which is correlated to patterns detected by the earlier layer. This layer is trained to do a very low level of pattern analysis such as identifying groups of related vibrations and statistical representations of vibrations.

The second layer of the model 188 has a single sublayer. This layer has recursive connections 189 between outputs of neurons of the model which allows the model to represent time sequences. In practice this layer would have other sublayers with much more complete connections between the neurons of the layer. These sublayers are omitted to simplify the figure. This layer could be trained to work on the output of the first layer to identify time structures of vibrations.

The third layer of the model 190 is similar in structure to the first. It would receive training on much higher level data. In a typical embodiment it would identify movements of people from the patterns developed by earlier layers. In some embodiments it would identify particular people from patterns of vibrations and in other embodiments an additional layer would be added for that purpose.

The fourth depicted layer 191 is shown as being trained in an in-use training level. Data from a sensor is processed by a training program to allow more effective machine learning methods to be applied at that late stage by a training module 192 on the evaluating processor. Because of the limited time an processing power available for real time training this is limited in scope but because of the extensive analysis already done on the data by earlier layers of the model, a very simple layer with simple training can make a major contribution to the results.

The outputs of the last layer are available then for non machine learning processing, counting and use or display 193.

I claim:

1. A system for counting persons comprising:
(a) A sensor to produce signals from vibrations in a floor connecting a set of at least three areas each of which a person may use to at least one of enter the floor and exit the floor;
(b) a processor to evaluate a machine learning model wherein:
the model comprises a first layer wherein outputs of the layer are generated from an evaluation of the sensor signals on the basis of training to classify events based on timing and frequency determinations,
the model comprises a second layer to evaluate outputs of the first layer to produce an output identifying a multiplicity of locations of origin of signals produced by a particular person on the basis of training from signals collected from the sensor,
the processor produces an output of the model on the basis of the locations which signifies that a person has entered using a particular one of the areas of the set and the person has exited using a particular one of the areas of the set; and
(c) an output device for at least one of signaling a count produced on the basis of the output of persons which have entered by a particular one of the areas of the set and exited by a particular one of the areas of the set and of displaying a count of persons which have entered by a particular one of the areas of the set and exited by a particular one of the areas of the set.

2. The method of claim 1 wherein:
the count is restricted to persons who have been identified on the basis of signals from the sensor as being in a portion of the floor during a time range.

3. The method of claim 2 wherein:
the time range is determined by an event other than vibrations in the floor.

4. The system of claim 1 wherein:
the second layer of the model comprises two sub-layers with one sub-layer of the second layer receiving outputs signifying locations of persons from a second sub-layer of the second layer of the model and producing outputs signifying that the same person has produced vibrations at a multiplicity of the signified locations.

5. The system of claim 1 wherein:
a second processor trains the model,
the model is downloaded to said first processor, and said first processor evaluates inputs from the sensor and produces the output of the model.

6. The system of claim 5 wherein:
said first processor trains the model subsequent to the training of the second processor.

7. The system of claim 1 wherein:
a second sensor to detect vibrations in the floor provides data used to train the model.

8. A system for counting persons comprising:
(a) A sensor to produce signals from vibrations in a floor connecting a set of at least two areas each of which a person may use to at least one of enter the floor and exit the floor;
(b) a processor to evaluate a machine learning model wherein:
the model comprises a first layer wherein outputs of the layer are generated from an evaluation of the sensor signals on the basis of training to classify events based on timing and frequency determinations, the model comprises a second layer to evaluate outputs of the first layer to produce an output identifying a multiplicity of locations of origin of signals produced by a particular person on the basis of training from signals collected from the sensor, and the processor produces an output of the model on the basis of the locations which signifies that a person has entered using a particular one of the areas of the set and the person has exited using a particular one of the areas of the set; and (c) an output device for at least one of signaling a count of a set of persons produced on the basis of the output wherein the set of persons consists of persons who have entered by a particular one of the areas of the set of areas and exited by a particular one of the areas of the set of areas and of displaying a count of persons which have entered by a particular one of the areas of the set of areas and exited by a particular one of the areas of the set of areas, and wherein the set of persons is limited to persons who have been identified as having been in a specific area of the floor in a specific time range.

9. The system of claim 8 wherein:
the time range is determined by an event other than vibrations sensed in the floor.

10. The system of claim 8 wherein:
the second layer of the model comprises two sub-layers with one sub-layer of the second layer receiving outputs signifying locations of persons from a second sub-layer of the second layer of the model and producing outputs signifying that the same person has produced vibrations at a multiplicity of the signified locations.

11. The system of claim 8 wherein:
a second processor trains the model,
the model is downloaded to said first processor, and
evaluates inputs from the sensor and produces the output of the model.

12. The system of claim 11 wherein:
said first processor trains the model subsequent to the training of the second processor.

13. The system of claim 8 wherein:
a second sensor to detect vibrations in the floor provides data used to train the model.

* * * * *